No. 873,784.

PATENTED DEC. 17, 1907.

H. C. REICHARDT.
FISHING REEL.
APPLICATION FILED OCT. 19, 1905. RENEWED MAY 13, 1907.

WITNESSES:
W. W. Canby.
H. L. Cheesman

INVENTOR
Henry C. Reichardt
by
A. V. Groupp
ATTORNEY.

UNITED STATES PATENT OFFICE.

HENRY C. REICHARDT, OF POTTSVILLE, PENNSYLVANIA.

FISHING-REEL.

No. 873,784.  Specification of Letters Patent.  Patented Dec. 17, 1907.

Application filed October 19, 1905. Serial No. 283,380. Renewed May 13, 1907. Serial No. 373,377.

*To all whom it may concern:*

Be it known that I, HENRY C. REICHARDT, a citizen of the United States, residing at Pottsville, in the county of Schuylkill and State of Pennsylvania, have invented certain new and useful Improvements in Fishing-Reels, of which the following is a specification.

This invention relates to fishing reels, the object being to provide a simple and efficient construction and organization of mechanism whereby the rotatable line-receiving member may be operated by a reciprocative part to rapidly wind the line upon the member; and a further object of the invention is to provide a means whereby the said member may be connected with or disconnected from the reciprocative part as desired.

The invention consists in the novel construction and combinations of parts hereinafter fully described and claimed.

Figure 1:
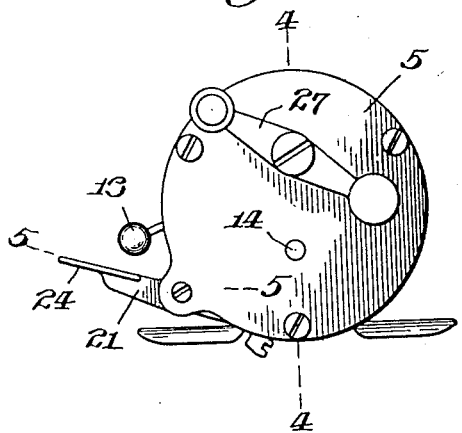
Figure 2:
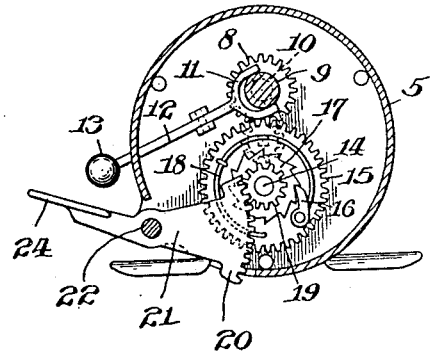
Figure 3:
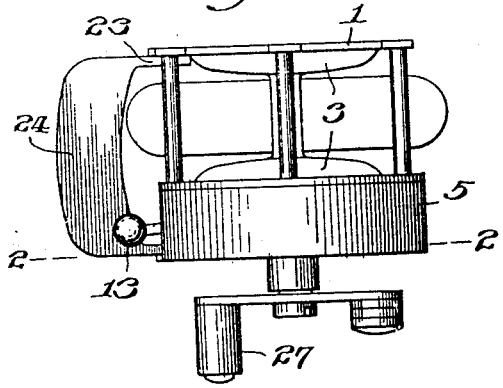
Figure 4:
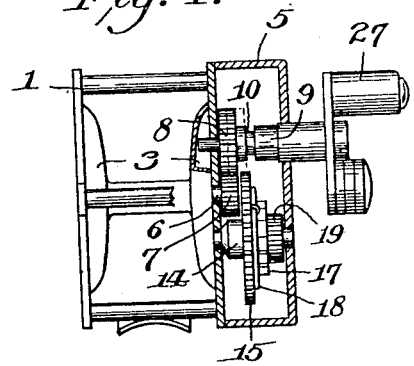
Figure 5:
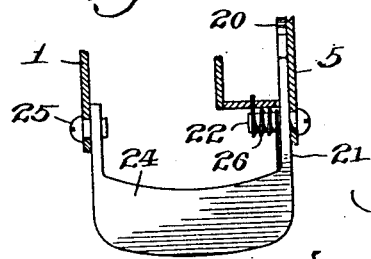

In the drawings—Figure 1 is a side elevation of a fishing reel embodying my invention. Fig. 2 is a sectional view, as on the line 2—2 of Fig. 3. Fig. 3 is a plan view. Fig. 4 is a sectional view, as on the line 4—4 of Fig. 1, showing one position of the adjustable gear wheel 8 by dotted lines. Fig. 5 is a sectional detail, as on the line 5—5 of Fig. 1.

1 designates the frame of the reel and 3 the rotatable line-receiving member journaled therein which are of usual and well known construction.

Formed on or secured to one side of the frame 1 is a casing 5 into which extends one end of the shaft 6 of the member 3. This shaft 6 is provided with a gear wheel 7 in mesh with a similar wheel 8 on a longitudinally-movable shaft 9 journaled in the frame 1 and casing 5. The shaft 9 has formed therein a circumferential groove 10 in which are arranged the pins of a yoke 11 on one end of a lever 12 which is pivoted to a projection on the frame 1. The other end of the lever 12 extends out through the casing 5 and is provided with a knob 13 whereby the lever may be operated to shift the shaft 9 and therewith the gear wheel 8 longitudinally within limits.

Extending through and journaled in the casing 5 below the shaft 9 is a shaft 14 having affixed thereto a gear wheel 15. The upper teeth of this gear wheel 15 are in line with the lower teeth of the gear wheel 8, to the end that, when the shaft 9 is moved by the lever 12, the gear wheel 8 may be moved into engagement with the gear wheel 15 without being disengaged from the gear wheel 7, and back again.

Pivoted to the gear wheel 15 is a pawl 16 adapted to engage a ratchet wheel 17 which is loosely mounted on the shaft 14, the pawl being pressed into engagement with the ratchet wheel by a suitable spring 18 carried by the gear wheel 15. Fixed to the ratchet wheel 17 and loose on the shaft 14 is a gear wheel 19 which is engaged by a toothed sector 20 on the inner end of an arm 21 which is pivotally mounted on a stud 22 carried by a projection on the casing 5.

Extending between the outer end of the arm 21 and an arm 23 is a plate 24, the arm 23 being pivoted to the opposite side of the frame 1, as at 25, in line with the stud 22, whereby, by moving the plate up and down, the sector 20 may be reciprocated. The arm 21 and its connected parts are held normally in the position shown by the action of a spring 26, so that by pressing down upon the plate 24 against the action of the spring 26, the sector 20 may be moved to turn the gear wheel 19 in one direction, and that by releasing the pressure from the plate 24, the spring 26 will move the sector to normal position to turn the gear wheel 19 in the reverse direction. By rapidly pressing and releasing the plate 24, the sector 20 will reciprocate the gear wheel 19 and therewith the ratchet wheel 17. When the ratchet wheel 17 is turned in one direction it engages the pawl 16 to turn the gear wheel 15, and when the ratchet wheel 17 is turned in the reverse direction, the pawl 16 is released and the gear wheel 15 is unaffected thereby. When the lever 12 is shifted to bring the gear wheel 8 into mesh with both the gear wheels 7 and 15, the rotation of the gear wheel 15 causes the rotation of the line-receiving member 3, through the gear wheels 7 and 8. Thus it will be seen that by rapidly reciprocating the plate 24, the fishing line may be rapidly wound upon the member 3.

The shaft 9 extends outwardly through the casing 5 and it is provided with a crank 27 by means of which, through the gear wheels 7 and 8, the member 3 may be rotated, when the lever 12 is moved to disengage the gear wheel 8 from the gear wheel 15.

I claim:—

1. In a fishing reel, the combination with the rotatable line-receiving member, of a toothed reciprocative member, gearing between said members, and a pawl and ratchet wheel to actuate said gearing when the second named member is moved in one direction.

2. In a fishing reel, the combination with the rotatable line-receiving member, of a toothed reciprocative member, a gear wheel engaged therewith, a second gear wheel, a pawl and ratchet connection between said gear wheels, and gearing between the second named gear wheel and the first named member.

3. In a fishing reel, the combination with the rotatable line-receiving member, of a toothed reciprocative member, a gear wheel engaged therewith, a second gear wheel, a pawl and ratchet connection between said gear wheels, gearing between the second named gear wheel and the first named member, and means for connecting and disconnecting the second named gear wheel with and from said gearing.

4. In a fishing reel, the combination with the rotatable line-receiving member, of a toothed reciprocative member, a gear wheel engaged therewith, a second gear wheel, a pawl and ratchet connection between said gear wheels, a gear wheel connected to the first named member, a movable gear wheel engaged with the last named gear wheel, and means adapted to be operated to move the movable gear wheel into engagement with said second gear wheel.

In testimony whereof I affix my signature in presence of two witnesses.

HENRY C. REICHARDT.

Witnesses:
C. W. HALBACH,
E. F. CLAUSER.